(12) United States Patent
Meisner

(10) Patent No.: US 8,375,999 B2
(45) Date of Patent: Feb. 19, 2013

(54) OFFBOARD HEAT MANAGEMENT DURING COMPRESSED GAS FILLING OF VEHICULAR HYDROGEN STORAGE TANKS

(75) Inventor: Gregory P. Meisner, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 796 days.

(21) Appl. No.: 12/551,017

(22) Filed: Aug. 31, 2009

(65) Prior Publication Data

US 2011/0048576 A1   Mar. 3, 2011

(51) Int. Cl.
*B65B 1/20* (2006.01)
(52) U.S. Cl. ............... 141/82; 141/11; 141/67; 141/95; 141/198
(58) Field of Classification Search .............. 141/2, 11, 141/67, 82, 83, 95, 192, 198
See application file for complete search history.

(56) References Cited

U.S. PATENT DOCUMENTS

| | | | |
|---|---|---|---|
| 3,719,196 A * | 3/1973 | McJones | 137/110 |
| 6,604,555 B2 * | 8/2003 | Blatt et al. | 141/21 |
| 6,722,399 B1 * | 4/2004 | Cano | 141/67 |
| 7,124,790 B2 * | 10/2006 | Bushko | 141/82 |
| 7,128,103 B2 * | 10/2006 | Mitlitsky et al. | 141/248 |
| 7,568,507 B2 * | 8/2009 | Farese et al. | 141/95 |
| 7,938,149 B2 * | 5/2011 | Handa | 141/82 |
| 7,987,877 B2 * | 8/2011 | Bavarian et al. | 141/5 |
| 8,122,918 B2 * | 2/2012 | Handa | 141/95 |

* cited by examiner

*Primary Examiner* — Timothy L Maust
(74) *Attorney, Agent, or Firm* — Reising Ethington P.C.

(57) ABSTRACT

A method of filling a hydrogen gas storage tank with hydrogen gas includes filling an onboard hydrogen gas storage tank with hydrogen gas at substantially constant temperature and pressure while transferring a liquid from the hydrogen gas storage tank to a reservoir tank, compressing a gas in the reservoir tank by the flow of liquid into the reservoir tank, and managing the heat produced by the compression of gas in the reservoir tank off board the vehicle. A hydrogen gas delivery system includes an onboard hydrogen gas storage tank, a hydrogen gas supply line, a reservoir tank, and a liquid that transfers the heat of filling the hydrogen gas storage tank to the reservoir by effecting a compression of gas in the reservoir.

8 Claims, 4 Drawing Sheets

OFFBOARD HEAT MANAGEMENT DURING COMPRESSED GAS FILLING OF VEHICULAR HYDROGEN STORAGE TANKS

TECHNICAL FIELD

This disclosure relates to a method of filling compressed hydrogen gas storage tanks on vehicles without onboard heat management. More particularly, this disclosure relates to a reservoir system in a hydrogen filling station containing a liquid that transfers the heat of filling from the vehicle tank to the reservoir by effecting a compression of gas in the reservoir driven by the hydrogen gas filling the vehicle tank at substantially constant pressure and temperature.

BACKGROUND OF THE INVENTION

One of the issues regarding vehicles having a fuel cell or hydrogen powered engine is the refilling time of the hydrogen stored onboard the vehicle. In compressed gas hydrogen storage systems, the transfer of high pressure gas from the filling station gas supply to an empty tank onboard a vehicle results in the conversion of the high enthalpy of the gas into heat in the tank as it fills causing the temperature of the stored gas and the onboard tank to rise significantly.

When a gas fills an initially evacuated tank, the gas conducts heat to the tank walls. The actual temperature increase of the gas and the tank depends on the amount of gas put into the tank and the heat capacity of the tank itself. The result of this increase in temperature of the gas and tank system is to reduce the amount of gas that can be put into the tank at the pressure supplied by the filling station gas supply. Therefore, a complete filling of the onboard tank requires active heat management to extract the heat of filling from the onboard tank. Without active heat management, the filling time would be unacceptably long due to slow passive dissipation of heat from the onboard tank to the surrounding environment.

It is known in the art to manage heat of onboard compressed tanks by (1) active cooling of the tank, which requires additional onboard equipment that adds cost and weight to the vehicle; (2) significant active cooling of the hydrogen gas prior to filling; and (3) careful monitoring of the temperature of a slowly filling tank and correspondingly controlling the pressure and flow of the filling hydrogen gas to optimize the heat load in the tank to match the active or passive heat management of the tank. An improved method of filling a compressed hydrogen gas storage tank on a vehicle is needed.

SUMMARY OF THE INVENTION

In one embodiment, a method of filling a hydrogen gas storage tank onboard a vehicle accomplishes a transfer of the heat of filling the onboard hydrogen storage tank to a refueling station's reservoir located off board the vehicle. This allows the high pressure hydrogen gas to flow into the onboard tank at constant pressure and temperature. Because the temperature of the gas remains essentially constant, there is no need for precise filling temperature monitoring and filling algorithms. The only significant limitations on the tank filling rate are the gas and liquid flow rates through the various pipes and valves of the refueling system.

In one embodiment, a method of filling a hydrogen gas storage tank with hydrogen gas includes first transferring a liquid from a reservoir tank to the hydrogen gas storage tank. The liquid, for example water, does not react with hydrogen gas. Next the method includes delivering hydrogen gas at a desired pressure and temperature from a hydrogen source into the hydrogen gas storage tank. The hydrogen gas entering the hydrogen gas storage tank displaces the liquid in the hydrogen gas storage tank, and this liquid flows into the reservoir tank against resistance such that the pressure and temperature of the hydrogen gas in the hydrogen gas storage tank remains substantially constant.

The liquid flowing into the reservoir tank compresses the hydrogen gas present in the reservoir tank, producing heat. The heat is managed by, for example, off board passive dissipation of the heat of filling in the reservoir tank via conduction and/or convection of that heat to the environment of the filling station. Alternatively, active cooling may be implemented via air, water, or refrigerant cooled heat sinks on the exterior of the reservoir tank, or by similar internal heat exchangers to accomplish the heat removal from the compressed gas in the reservoir tank. This may not be necessary for the filling of one onboard hydrogen storage tank, but it may be necessary in order to achieve rapid turnaround of the filling station for the next efficient refueling of another onboard tank. The heat of filling the hydrogen gas storage tank is thus managed outside of the hydrogen gas storage tank. In one embodiment, the hydrogen gas storage tank may be onboard a vehicle, and the onboard hydrogen gas storage tank is filled with hydrogen gas at a filling station without the need for heat management onboard the vehicle.

In another embodiment, a hydrogen gas delivery system includes an onboard hydrogen gas storage tank, a hydrogen gas supply line, a reservoir tank, and a liquid that transfers the heat of filling the hydrogen gas storage tank to the reservoir by effecting a compression of gas in the reservoir. In various embodiments, the onboard hydrogen gas storage tank may be at least partially filled with an onboard rechargeable hydrogen storage alloy, for example a metal hydride, a complex hydride, or a chemical hydride.

DESCRIPTION OF PREFERRED EMBODIMENTS

Figure 1:
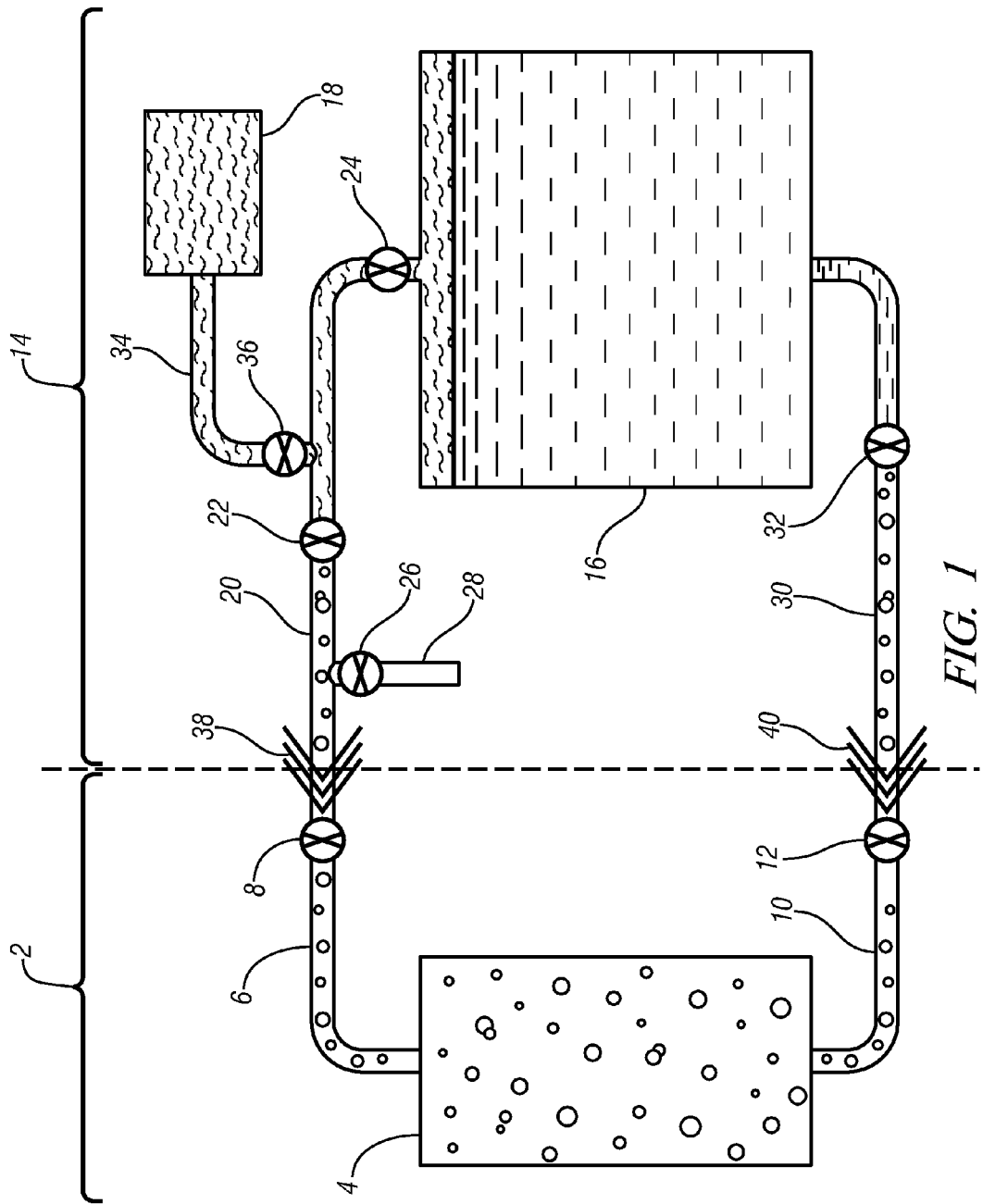
FIG. 1 illustrates a method of filling a hydrogen gas storage tank according to one embodiment of the invention where the hydrogen gas storage tank may initially contain residual gas and a reservoir tank may initially contain liquid.

In one embodiment, a system is provided for rapidly filling a tank with hydrogen gas without the need for active heat management onboard the vehicle during the filling. For example, a 400 liter tank may be filled with hydrogen gas in less than 5 minutes. The rate limiting steps are the filling and discharging of the liquid into and out of the onboard tank. For a filling pressure of 10 bars, a 1 cm diameter fill pipe 2 meters long is estimated to fill at a rate of 52 gal/min, or 197 liters/min. Under these conditions, it would take approximately 2 minutes to fill a 400 liter onboard tank. The tank may be a compressed hydrogen gas storage tank that is onboard a fuel cell vehicle.

The system may include a reservoir tank at the filling station. The reservoir tank may be partially filled with a liquid and partially filled with a gas at a high pressure comparable to, but somewhat less than the pressure of the hydrogen gas supply at the filling station. The pressure in the reservoir tank may be adjusted up or down by adding gas from the hydrogen supply at the filling station or by venting, as necessary, to achieve optimal conditions for rapid transfer of the liquid to the onboard tank. If the pressure in the reservoir tank is too low, then the liquid transfer to the onboard tank would be too slow.

Before starting the onboard tank filling procedure, the reservoir tank pressure should be about 10 bars lower than the hydrogen gas supply at the filling station so that when this gas is re-compressed in the reservoir tank by the action of the liquid being forced back from the onboard tank into the reservoir tank at the pressure of the hydrogen gas supply, there will be enough pressure difference between the onboard tank and the reservoir tank so that the liquid is completely returned to the reservoir at a sufficiently fast rate. The reservoir tank may be connected to the onboard tank in such a manner that when the onboard tank is empty or substantially empty, the liquid is forced from the reservoir tank into the onboard tank by the high pressure gas in the reservoir tank.

The liquid displaces the residual hydrogen gas in the onboard tank, which is forced out at low pressure via a vent to the filling station for recapture and re-use as fuel. Because this residual gas in the onboard tank is not compressed during this operation, there will be no heating of the gas or the onboard tank. Then, when the high pressure hydrogen supply gas is allowed to flow into and fill the onboard tank, the pressure in the onboard tank will be at a constant value, equal to that of the supply gas in the filling station, from the beginning of the filling process through to completion. As the onboard tank fills with hydrogen gas at constant pressure, the liquid in the onboard tank will be forced back into the reservoir tank so that it compresses the gas in the reservoir tank. The liquid transfers the heat of filling the onboard gas tank to the off board reservoir tank by effecting a compression of gas in the reservoir tank.

A separate gas manifold connection to the onboard tank is made to accommodate the first step of venting the low pressure residual gas in the nearly empty onboard tank configured with a relief valve system so that the pressure of the residual gas does not increase during the time the liquid fills the onboard tank. The onboard tank can be evacuated through the gas manifold to assist in the liquid flowing into the onboard tank from the reservoir tank. The gas manifold is also configured with suitable valves and connections to close off the vent and allow filling of the onboard tank with the high pressure compressed hydrogen supply gas.

Figure 2:
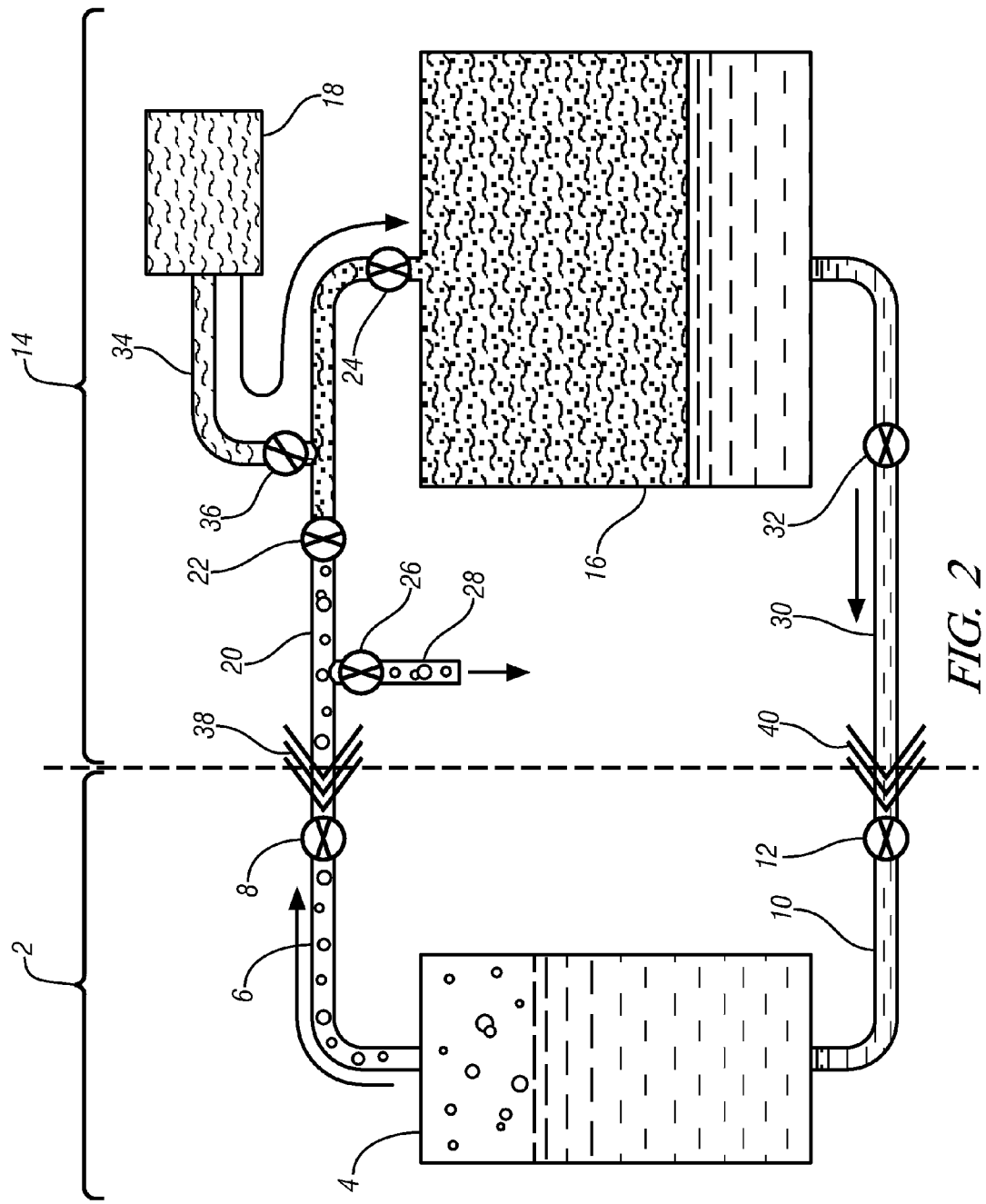
FIG. 2 illustrates a method of filling a hydrogen gas storage tank according to one embodiment of the invention including allowing hydrogen gas to flow from a hydrogen gas supply line at a filling station into the reservoir tank and allowing liquid to flow from the reservoir tank to the onboard hydrogen gas storage tank to displace the residual gas.
Figure 3:
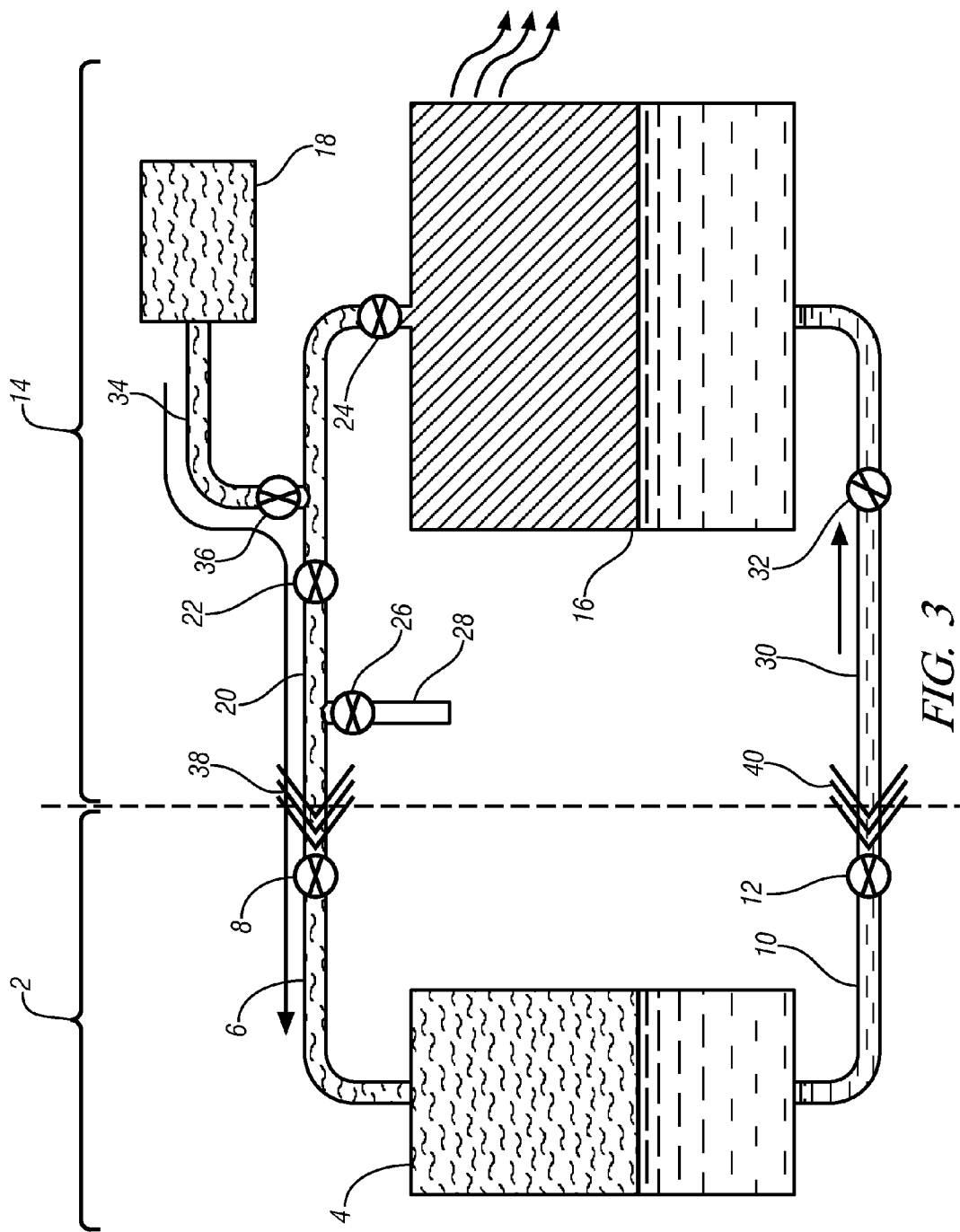
FIG. 3 illustrates a method of filling a hydrogen gas storage tank according to one embodiment of the invention including allowing hydrogen gas to flow from the hydrogen gas supply line into the onboard hydrogen gas storage tank at constant pressure and allowing the liquid in the hydrogen gas storage tank to flow back into the reservoir tank, thus compressing the hydrogen gas in the reservoir tank.

FIGS. 1, 2 and 3 show a method of filling of an onboard tank with hydrogen gas. As shown in FIG. 1, a vehicle 2 includes an onboard tank 4 connected to a first onboard pipe 6 having a first onboard valve 8 and a second onboard pipe 10 having a second onboard valve 12. The onboard tank 4 may contain residual gas having impurities (shown by bubbles). A hydrogen filling station 14 includes a reservoir tank 16 and a hydrogen gas supply line or tank 18. The hydrogen gas supply line or tank 18 may contain hydrogen gas at a first pressure (shown by waves).

The reservoir tank 16 may be partially filled with a liquid (shown by horizontal dashes) and partially filled with hydrogen gas at the first pressure. In one embodiment, the liquid may be an incompressible liquid that does not react with hydrogen gas. In one embodiment, the liquid may be water. In other embodiments, the liquid may be any relatively incompressible liquid (such as water-glycol mixtures, phosphate ester, and mineral oil). The liquid may need to be chosen to be compatible with the onboard hydrogen use, for example, in fuel cells where contamination of the gas may be detrimental. The water or other liquid may also help keep the hydrogen gas humidified, and some residual water may remain in the onboard tank 4 as needed for further humidification. The minimum amount of liquid needed in the system may be equal to the volume of the onboard tank 4.

The onboard hydrogen gas storage tank 4 may be at least partially filled with a hydrogen storage alloy, for example a metal hydride, a complex hydride, or a chemical hydride. Heat may be produced when the hydrogen storage alloy absorbs hydrogen upon filling of the tank with hydrogen gas. This heat generated by the exothermic reaction of hydrogen with the hydrogen storage alloy is absorbed quickly by the liquid in the onboard tank in a thermal equilibration process because of the intimate physical contact between the hydrogen storage material and the liquid. Due to the heat capacity of the liquid in the onboard tank, the heat generated results in a smaller temperature rise than if the liquid were not present in the onboard tank. The heat is then removed from the onboard tank and from the hydrogen storage material by the action of expelling the warmed liquid from the onboard tank and by the cooler supply gas in the hydrogen filling process as described above when there is no hydrogen storage material present in the onboard tank.

The reservoir tank 16 is connected to a first reservoir pipe 20 having a first reservoir valve 22 and a second reservoir valve 24. The first reservoir pipe 20 is also connected to a third reservoir valve 26 having a vent 28. The reservoir tank 16 is also connected to a second reservoir pipe 30 having a fourth reservoir valve 32. The first reservoir pipe 20 connects to a hydrogen gas supply pipe 34 via a gas supply pipe valve 36.

The first onboard pipe 6 is capable of liquid and hydrogen gas communication with the first reservoir pipe 20 through a first connector 38. The second onboard pipe 10 is capable of liquid and hydrogen gas communication with the second reservoir pipe 30 through a second connector 40.

In one embodiment, a method is provided for filling the onboard tank 4 with hydrogen gas from the hydrogen gas supply tank 18 at the filling station 14. The vehicle and the filling station are first connected via the first and second connectors 38, 40. As shown in FIG. 1, when the vehicle 2 is initially connected to the hydrogen filling station 14, the onboard tank 4 may contain residual gas having impurities, and the reservoir tank 16 may be mostly filled with liquid, for example water.

Referring to FIG. 2, according to one embodiment, the valves 8, 12, 24, 26, and 32 are then opened to permit the appropriate flow of hydrogen gas and liquid as will be described. Valve 36 may be partially opened for adjustments to increase the pressure in the reservoir 16 so that the flow of the liquid is maintained at an optimal rate into the onboard tank 4. In this case, the hydrogen gas from the hydrogen gas supply tank 18 flows into the reservoir tank 16 through pipe 34 and the portion of pipe 20 between the valve 22 (which is closed) and the reservoir tank 16. The hydrogen gas flowing into the reservoir tank 16 displaces the liquid, forcing the liquid to exit the reservoir tank 16 and flow through pipes 30 and 10 into the onboard tank 14. As the liquid is forced out of the reservoir tank 16, the hydrogen gas in the reservoir tank 16 expands, resulting in a lower second pressure inside the reservoir tank 16. The hydrogen at the lower second pressure is shown by waves and dots. The second pressure is equal to or somewhat less than the pressure of the hydrogen gas in the hydrogen gas supply tank 18.

The liquid entering the onboard hydrogen gas storage tank 14 displaces the residual gas, forcing the residual gas in the onboard tank 14 to flow out of the tank 14 at a low and constant pressure. The residual gas is thus purged through pipes 6 and 20 and out of the vent 28. The residual gas may either be vented at the filling station 14 or captured and recompressed using additional pipes connected between pipe 28 and a compressor at the filling station (not shown). If all of the residual gas is vented, some amount of the liquid may also exit the vent 28. The valve 22 remains closed. Thus, the onboard tank 14 may be purged of any residual impurities before being filled with hydrogen gas at the filling station 14, and the residual gas in the onboard tank 14 will not be heated by compression in the onboard tank 4. The onboard tank 14 is filled with liquid until the residual gas in the onboard tank 14 reaches a predetermined minimal volume, which may be zero.

Referring to FIG. 3, the valves 26 and 24 are then closed. The valve 32 is closed, but later is adjusted partially open as will be described. The valve 36 and the valve 22 are opened to allow the high pressure hydrogen gas at the first pressure to flow from the hydrogen gas supply line 18 through the hydrogen gas supply pipe 34, the first reservoir pipe 20, and the first onboard pipe 6 to the onboard tank 4. The volume for gas that initially is present in the onboard tank 4 (when the valves 36 and 22 are opened) is minimal, and may be zero. As this minimal volume is filled to the supply pressure, the heat of filling is small because the amount of gas needed to fill that minimal volume is correspondingly small. The heat generated by the compression of the liquid by applying the high pressure supply gas to the onboard tank is also very small, close to zero, because the liquid is incompressible or nearly incompressible.

The valve 32 is then adjusted partially open to allow the liquid to flow from the onboard tank 4, under the action of the high pressure gas from the filling station 18, into the reservoir. The hydrogen gas entering the onboard tank 4 displaces the fluid into the reservoir tank, where it encounters the resistance of the hydrogen gas in the reservoir tank. Thus, the hydrogen gas in the onboard tank 4 will remain at substantially constant temperature and pressure, where substantially constant means that the temperature may vary by only approximately 5° C., and the pressure may vary by only approximately 2 bar. The added heat capacity of the liquid in the onboard tank 4 may help to ensure that any temperature rise is negligible. Moreover, if the liquid temperature in the onboard tank 4 does rise, that heat will be rapidly removed when the liquid is removed as the onboard tank 4 is filled with hydrogen gas from the hydrogen gas supply tank 18.

As shown in FIG. 3, the valve 32 is throttled to maintain high pressure in the onboard tank 4 as the liquid flows from the onboard tank 4 back into the reservoir tank 16. As the liquid flows into the reservoir tank 16, the hydrogen gas in the reservoir tank 16 is compressed (shown as diagonal lines) and releases heat. The heat of filling the onboard tank 4 is the work done on compressing the hydrogen gas in the reservoir tank 16, which then experiences a rise in temperature.

Active or passive heat management may be provided at the filling station 14 to accommodate this heat (not shown). For example, a passive system may allow the heat to conduct from the reservoir tank 16 to the environment of the filling station to reach thermal equilibrium at ambient temperature. Alternatively, an active system of air, water, or refrigerant cooling could be employed to more rapidly cool the compressing gas in the reservoir. This could be in the form of finned heat sinks on the outside of the reservoir tank 16, or a heat exchanger internal to the reservoir tank 16. Cooling of the reservoir may not be required during the filling of one onboard tank, but only to increase the rate of filling another onboard tank, such as on another vehicle, using the same filling apparatus.

But the hydrogen gas that fills the onboard tank 4 remains at a constant pressure and temperature as the volume of that gas is increased due to the liquid flowing out of the onboard tank 4 and into the reservoir tank 16. In other words, the heat load on the onboard tank 4 is completely transferred to the work of compression of the hydrogen gas in the reservoir tank 16 in the hydrogen filling station 14. Therefore, no heat management is needed onboard the vehicle.

If the onboard tank 4 is completely emptied of the liquid, overfilling of the onboard tank 4 with hydrogen gas simply results in hydrogen gas flowing into the reservoir tank 16 to further increase the pressure in the reservoir tank 16 to a maximum of the pressure of the hydrogen gas supply tank 18, or to some other maximum desired pressure. This adds a measure of safety to not allow over pressurizing the onboard tank 4 in the vehicle, and ensures that sufficient hydrogen gas remains in the reservoir tank 16 to enable the hydrogen filling station to refill the onboard tank of another vehicle.

Figure 4:
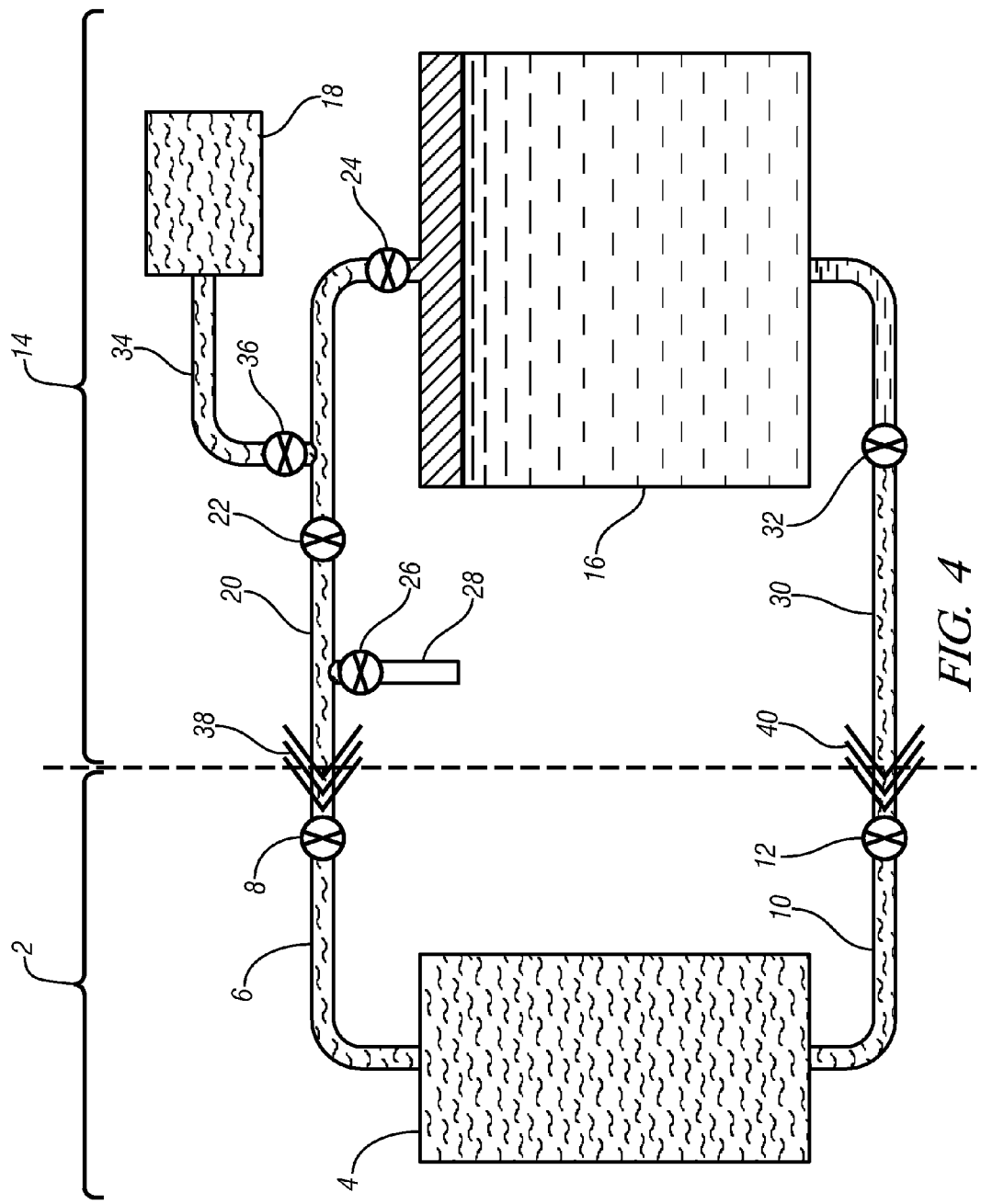
FIG. 4 illustrates a method of filling a hydrogen gas storage tank according to one embodiment of the invention including closing the appropriate valves in the system when the liquid remaining in the hydrogen gas storage tank reaches a predetermined residual volume and the hydrogen gas storage tank is substantially filled with hydrogen gas from the hydrogen gas supply line at the filling station.

Referring to FIG. 4, when the liquid in the onboard tank 4 reaches a predetermined residual volume, which may be zero, all of the valves may be closed. At this point, the onboard tank 4 is full of hydrogen gas, and the vehicle 2 may be disconnected from the filling station 14 via the connectors 38, 40.

The practice of the invention has been illustrated with certain embodiments but the scope of the invention is not limited to such examples.

The invention claimed is:

1. A method of re-filling a storage tank for compressed hydrogen gas, wherein the tank is connected to a hydrogen gas supply line, from a source of compressed hydrogen gas, through a first valve, the supply line containing compressed hydrogen gas for delivery to the hydrogen gas storage tank, the hydrogen gas storage tank being connected to a reservoir tank through a second valve, the reservoir tank comprising a liquid that is chemically unreactive with hydrogen, and reservoir hydrogen gas at a second pressure, and the hydrogen supply line is connected to the reservoir tank through a third valve, the method comprising:

opening the second and third valves to allow hydrogen gas to flow into the reservoir tank, to allow the liquid to flow from the reservoir tank into the hydrogen gas storage tank, and to allow residual gas in the hydrogen gas storage tank to flow out of the hydrogen gas to a vent;

closing the third valve when the hydrogen gas storage tank has been filled by the liquid such that the residual gas in the hydrogen gas storage tank reaches a predetermined minimal volume;

opening the first valve to allow the hydrogen gas to flow from the hydrogen gas supply line to the hydrogen gas storage tank at substantially constant temperature and pressure, and to allow the liquid in the hydrogen gas storage tank to flow back to the reservoir tank and compress the reservoir gas in the reservoir tank; and closing the first and second valves when the liquid in the hydrogen gas storage tank reaches a predetermined residual volume.

2. A method as set forth in claim 1 further comprising removing the heat generated by the compressed reservoir gas in the reservoir tank.

3. A method as set forth in claim 2 wherein removing the heat comprises at least one of off board passive heat dissipation or active cooling using heat exchangers on the interior or exterior of the reservoir tank.

4. A method as set forth in claim 1 wherein the hydrogen gas storage tank is onboard a vehicle, and the hydrogen gas supply and reservoir tank are not onboard the vehicle.

5. A method as set forth in claim 1 wherein the liquid is water.

6. A method as set forth in claim 1 wherein the liquid is a water-glycol mixture, phosphate ester, or mineral oil.

7. A method as set forth in claim 1 wherein the hydrogen gas storage tank is at least partially filled with a hydrogen storage material that is reversible by hydrogen pressurization and is compatible with the liquid.

8. A method as set forth in claim 7 wherein the hydrogen storage material comprises at least one of a metal hydride, chemical hydride, or complex hydride.

* * * * *